United States Patent [19]

Verplanke

[11] 4,011,912
[45] Mar. 15, 1977

[54] UNEARTHING DEVICE FOR HARVESTING GROUND VEGETABLES, SUCH AS TURNIPS

[75] Inventor: Mattheus-Willem Verplanke, Ijzendijke, Netherlands

[73] Assignee: Wilhelm Stoll Maschinenfabrik GmbH, Lengede-Broistedt, Germany

[22] Filed: Sept. 10, 1975

[21] Appl. No.: 612,207

[30] Foreign Application Priority Data

Sept. 12, 1974 Germany .......................... 2443609

[52] U.S. Cl. .............................................. 171/101
[51] Int. Cl.² ........................................ A01D 19/02
[58] Field of Search ............................ 171/83–110, 171/71

[56] References Cited

UNITED STATES PATENTS 517,516  4/1894  Buck .................................. 171/71

FOREIGN PATENTS OR APPLICATIONS 506,168  10/1951  Belgium ............................. 171/101
877,840  5/1953  Germany ............................ 171/101
611,681  11/1948  United Kingdom ............... 171/101

*Primary Examiner*—Russell R. Kinsey
*Attorney, Agent, or Firm*—Woodhams, Blanchard and Flynn

[57] ABSTRACT

Harvesting machine for ground vegetables, such as turnips. In such machine, there is provided an unearthing component including a pair of share halves which cooperate to comprise an unearthing share. A driven conveyor element is positioned directly above said unearthing share for moving unearthed vegetables onto other means such as a grating. The conveyor means comprise a generally disk-shaped base having a plurality of arms extending generally radially therefrom. Said arms are mounted in cylindrical housings fixed with respect to said disk and on one side thereof. Each of said arms extends first radially from said housing, then generally axially of said disk to a point adjacent the other side thereof, then again radially and angled in the normal direction of travel of said harvesting machine and terminating with a reverse bend. Said arms are resiliently related to said housing to permit rotation of same in and with respect to said housing together with a resiliently induced return to said arms' respective initial position. Thus, said arms will in normal operation urge said vegetables as desired from said shares to receiving means such as the above-mentioned grating but when necessary will yield to prevent damage to the vegetables.

6 Claims, 6 Drawing Figures

UNEARTHING DEVICE FOR HARVESTING GROUND VEGETABLES, SUCH AS TURNIPS

FIELD OF THE INVENTION

The invention relates to a digging device for a single- or multiple-row harvesting machine for ground vegetables, such as turnips, same having at least one unearthing share which consists of two unearthing share halves, in which conveyor elements are provided in the zone above and laterally alongside the unearthing share halves, said conveyor elements rotatingly driven about an axis which lies transversely to the direction of travel and approximately parallel with the ground and provided with conveyor teeth. The conveyor teeth of said conveyor elements move in conveying direction in the zone of the unearthing shares.

BACKGROUND OF THE INVENTION

Such a harvesting machine, in which conveyor elements having conveyor teeth are provided in the zone between the unearthing share and the mesh wheel, is known for example from German Gebrauchsmuster No. 1,773,582. However, there exists a disadvantage in these conventional conveyor elements having conveyor teeth in that such teeth, upon hitting the vegetables, as turnips, which are to be moved and cleaned, are able to yield or spring back to only a limited degree. This, in spite of the spring-back action of the conveyor teeth, causes damage to the turnips because the so-constructed conveyor teeth strike the turnips radially in conveying direction during moving of same and cause the damage.

German Pat. No. 877,840 discloses a conveyor element which is arranged on one side laterally above an unearthing share and the catch or conveying teeth thereof are constructed as resilient rods. The spring deflection of these catch teeth is, however, small because a certain lateral stability of same must also be maintained.

In the case of the two aforementioned conveyor elements, the teeth are also laterally deflected during an impact with the turnips which are to be moved which often causes the turnips not to be engaged at all thereafter or only by the next following teeth of the conveyor element.

SUMMARY OF THE INVENTION

The objective of the invention is to produce a conveyor element for conveying and cleaning of the unearthed ground vegetables, such as turnips, which by a simple and compact manner of construction substantially prevents damage to the vegetables and permits a smooth conveying of same. Reference hereinafter will be for illustrative purposes directed to the digging of turnips but such indication of use is not limiting.

This is achieved according to the invention by constructing for both unearthing share halves the conveyor teeth as conveyor arms, which are supported pivotally and spaced laterally from one another on radial bearing points, which are provided on a common hub, against the force of a spring element. Thus, starting from one bearing point, the radially extending section of the conveyor arm changes at a selected distance from the axis of the hub into an axially parallel lever arm section which extends from the one hub side to the other hub side, to which lever arm section is connected a section which points approximately radially and slightly forwardly in the direction of rotation. The outer end of such section has a catch section which is bent against the direction of rotation of the conveyor arms and slightly toward the turnip conveying channel.

Due to the fact that the conveyor arms, which are arranged above the unearthing share halves of an unearthing share, are hinged to a common hub, a simple and particularly compact type of construction is obtained, which makes it possible to store the device in a relatively small building space. It is further achieved in a particularly advantageous manner that damage to the turnips being conveyed and cleaned is substantially avoided, because the conveyor arms are able to yield upon contacting the turnips. At such yielding of the conveyor arms, the inventive hinging of the conveyor arms on the hub advantageously causes the conveyor arms, corresponding with the degree of deflection to be pulled more or less into the zone of the conveyor path of the turnips to be conveyed.

This swinging of the conveyor arms into the zone of the conveyor path effects in each case a safe moving on of the contacted turnips, because the respective conveyor arm extends then further into the zone of the conveyor path and thus engages the respective turnips and move same as desired. The turnips are thrown back and forth on a mesh grating, which is connected to the unearthing share, by the conveyor arms which laterally define the turnip conveyor channel and thereby effects a thorough cleaning of same from attached dirt and the like simultaneously with conveying.

According to a further characteristic of the invention, it is provided that as a spring element a rubber tire is arranged on the hub in the zone between the conveyor arms. Shackles rest on the side surfaces thereof which are each secured transversely on the radially extending section of the conveyor arms. During rotation of the conveyor arms, said shackles press the tire slightly inward and effect upon an unloading of the conveyor arms a springing back of same into their initial position. It is particularly advantageous in this embodiment that by regulating the air pressure in the rubber tire the deformability or the spring-back action of same can be changed and can thus be adjusted to the respectively existing turnip or ground conditions. Furthermore the tire achieves a limiting of the turnip conveying channel upwardly, which avoids an excessive accumulation of turnips, because the lever arm sections of the conveyor arms then move the turnips onward.

A further embodiment of the invention provides that shackles are secured on the radially extending part of the conveyor arms and are connected to tension or compression springs secured with respect to the hub. In this embodiment, simple tension or compression springs are used in place of the rubber tire as spring elements for the pivotable conveyor arms, which permits a simple and compact manner of construction.

In place of the tension or compression springs it is also possible to provide on the conveyor arms torsion springs which are secured at one end on said conveyor arms and at the other end on the hub.

A further feature of the invention provides that the distance between the conveyor arms and the unearthing shares can be varied. Through this adjustability of such distance, an adjustment to the different turnip and ground conditions is possible in a simple manner.

According to one exemplary embodiment, this is achieved by movably arranging crossbars for such distance adjustment, on which crossbars axial bearings for mounting the hub are secured relative to perforated rails which are secured on a support frame. In this type of construction only few structural parts are needed and these can also be manufactured simply. Of course the distance between the conveyor arms and the unearthing share can be changed both in single-row and also in multiple-row machines.

The inventive digging device can also, as with conventional digging devices, be supported laterally shiftably in the frame of the machine. This lateral shifting may be accomplished either by pivoting about a pivot bearing or by lateral movement in a guideway.

BRIEF DESCRIPTION OF THE DRAWINGS

The invention is illustrated in connection with some exemplary embodiments in the drawings and will be described more in detail hereinafter.

In the drawings.

DETAILED DESCRIPTION

Figure 1:
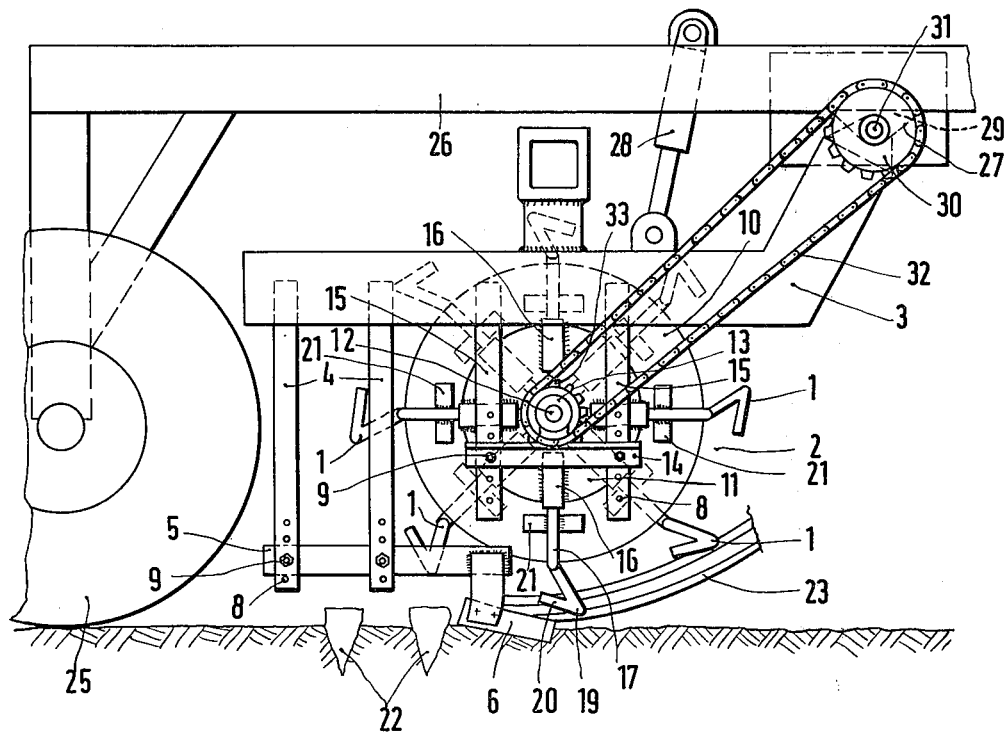
FIG. 1 is a schematic partial side view of a turnip harvesting machine, the unearthing device of which and the conveyor element of which is connected to a support frame, FIG. 2 schematically illustrates the arrangement according to FIG. 1 seen from the front, FIG. 3 schematically illustrates one embodiment of the support for a conveyor arm of the conveyor element having a torsion spring, FIG. 4 schematically illustrates a further embodiment of the support for a conveyor arm having two tension or pressure springs, FIG. 5 schematically illustrates the arrangement according to FIG. 4 seen from the side
Figure 2:
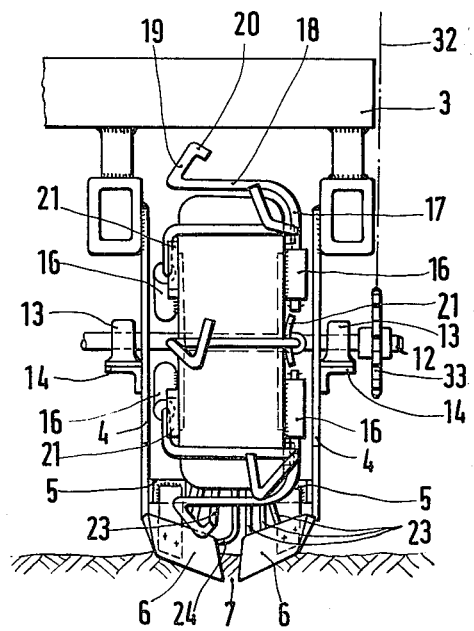

FIGS. 1 and 2 illustrate an unearthing device having a conveyor disk 2 on which are mounted conveyor arms 1. Said latter arms are secured on a support frame 3, which, as shown particularly in FIG. 1, is supported pivotally in a bearing 27 on a machine frame 26 of a machine which may be pulled or which drives itself. The machine frame 26 is supported through wheels 25 on the ground, and can be adjusted elevationally by means of a lifting cylinder 28 which engages at one end the machine frame 26 and at the other end the support frame 3. A sprocket 29 is secured adjacent the bearing 27 to the machine frame 26, which gear 29 is driven by the not illustrated drive unit of the machine and supports among others a drive shaft 31 which has a sprocket 30. The sprocket 30 is coupled by means of a chain 32 to a second sprocket 33 which is connected to the conveyor disk 2. In place of the illustrated chain drive it is of course also possible to use other conventional power transmitting means.

Perforated rails 4 are arranged parallel with respect to one another and secured on the front ends of the support frame 3, which ends lie in direction of travel of the machine. Said perforated rails 4 are connected at their lower ends, the ends adjacent the ground, to a sheet-metal holder 5 which extends transversely to the perforated rails 4 and on the ends of which, which lie opposite of the direction of travel of the machine, there is secured each one unearthing share half 6. The symmetrical arrangement of such two cooperating share halves results in an unearthing share 7. By vertically shifting the sheet metal holders 5 in the holes 8 provided at the lower ends of the perforated rails 4 and by securing the sheet metal holders 5 on the perforated rails 4 by means of screws 9, the working depth of the unearthing share 7 can easily by adjusted.

In the area above the unearthing share halves 6 and symmetrically thereto there is arranged a conveyor disk 2, which consists substantially of a hub 11 which is provided with conveyor arms 1, and on which hub a rubber tire 10 is secured. The conveyor disk 2 is with its hub 11 supported rotatably on a shaft 12 in shaft bearings 13. The shaft bearings 13 are secured on crossbars 14 which are connected to perforated rails 15 which in turn are secured on the support frame 3 and are arranged parallel to one another.

The conveyor arms 1 are supported for limited pivotal movement at a lateral distance from one another on the side surfaces of the hub 11 in bearing sleeves 16 which are arranged radially with respect to the circumferential circle of the conveyor disk 2 and are secured on the hub 11. A section 17 of the conveyor arm 1, which section extends first radially from its bearing sleeve 16, then changes at a point shortly beyond the outer diameter of the rubber tire 10 into an axially parallel lever arm section 18. This extends from the one hub side to the other hub side and connected thereto is a section 19 which projects approximately radially and in direction of rotation slightly forwardly. The outer end of said section 19 has a catch section 20 which is bent opposite the direction of rotation of the conveyor arm 1. A shackle 21, which is secured transversely on the radially extending section 17 of the conveyor arm 1, rests on the side surface of the rubber tire 10. After the turnips 22 have been lifted out by the unearthing share 7, they arrive on a mesh grating which is formed of mesh rods 23 and 24, where they are contacted by the outer ends of the conveyor arms 1 and cause rotation of said conveyor arms. The shackles 21 which under load slightly press in the rubber tire 10 cause upon removal of the load on the conveyor arms 1 a return rotation of the conveyor arms 1 into their initial position in consequence of the resilience of the rubber tire 10.

The bearing of the conveyor arms 1 on a common hub 11 permits a simple and especially compact method of construction of the device. It is also particularly advantageous that the conveyor arms 1 when they hit the turnips 22 can yield, so that damage to the turnips 22 is substantially avoided. The capability of the inventive conveyor arms 1 to yield furthermore make it possible for the arms 1, due to their deflection movement, to extend further into the conveyor path of the turnips 22 and thereby urge the turnips 22 safely onward. Furthermore the turnips 22 are cleaned thoroughly from attached soil and other dirt by their back-and-forth movement on the mesh grating through the conveyor arm 1.

In order to lift the turnips as quickly as possible and also to tilt the turnips 22 directly after the unearthing operation, the mesh rod 24 of the mesh grating in the zone of its point of connection to an unearthing share half 6 of the unearthing share 7 is bent first transversely to the conveyor direction of the turnips 22 to a point in the zone between the unearthing share halves 6 and thereafter extends in the conveying direction.

Adjustment of the distance between the unearthing share 7 and the conveyor arms 1 is accomplished by shifting the crossbars 14 in the holes 8 provided on the perforated rails 15 and by securing the crossbars 14 as desired on the perforated rails 15 by means of screws 9. It is advantageous in this embodiment that it has only a few simply manufactured structural parts and that the adjustment of the distance between the unearthing share 7 and the conveyor arms 1 permits in a simple manner an adjustment to different turnip and ground relationships.

Figure 3:
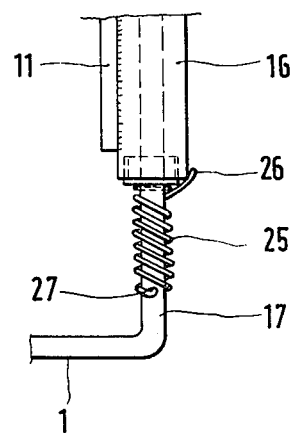

As shown in FIG. 3, a bearing sleeve 16, which is arranged parallel with a radius of the conveyor disk 2, is secured on a hub 11. A radially extending section 17 of the conveyor arm 1 is supported in said bearing sleeve 16. Said section 17 projects radially of the hub from the bearing sleeve 16, has a torsion spring 25, which is pivoted at its one end on a locking pin 27 on the conveyor arm 1 and at its other end on a locking pin 26 on the bearing sleeve 16. The torsion spring 25 permits in a simple manner, when the turnips 22 hit the conveyor arm 1, a resilient yielding or displacement of the conveyor arm 1 and thereafter the pivoting of same back into its initial position.

Figures 4, 5:
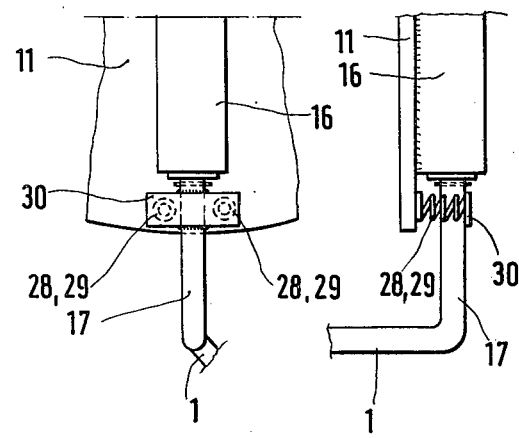

FIGS. 4 and 5 illustrate a mounting of the conveyor arm 1, in which tension springs 28 or compression springs 29 are used as spring elements. The bearing sleeve 16 is arranged radially with respect to the hub circumference, is secured on the hub 11 and supports the radially extending section 17 of the conveyor arm 1. A shackle 30 is secured transversely to the section 17 on the upper radially extending section 17 of the conveyor arm 1, which section does not face the hub 11. Said shackle is connected to two tension springs 28 or compression springs 29, while the other ends of the tension springs 28 or compression springs 29 are pivoted to the hub 11.

This embodiment permits with a simple and compact construction the use of simple tension or compression springs 28, 29 for pivoting the pivotable conveyor arm back into its initial position.

Figure 6:
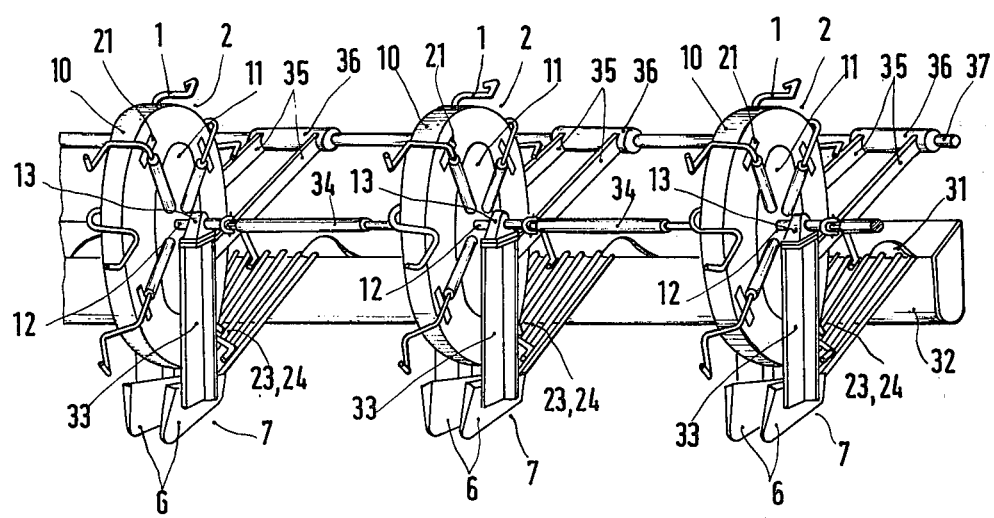
FIG. 6 is a scehmatic perspective illustration seen from the front of the arrangement of an unearthing device for a multiple-row machine.

FIG. 6 illustrates a three-row digging device, which is supported relative to the ground through support wheels (not illustrated in detail) by means of a support frame (also for simplicity not illustrated). The turnips removed from the ground by the unearthing shares 7 arrive on the mesh grating consisting of mesh rods 23, 24, are engaged by the conveyor arms 1 of the conveyor disks 2, which are driven rotatingly in conveying direction in the area of the mesh rods 23, 24 and are moved into a trough conveyor 32, which latter has a worm shaft 31 and is arranged perpendicularly to the direction of travel of the machine. The turnips can be moved on for example from the trough conveyor 32 through a not-illustrated lift conveyor into a turnip bunker. The conveyor disks 2, which consist substantially of a hub 11 which is provided with a rubber tire 10 and conveyor arms 1, supported radially and limitedly pivotal on said hub, are supported rotatably with their axes 12 in axial bearings 13. Said latter are arranged on share posts 33 which are directed approximately vertically to the ground and at the lower or ground ends thereof there is secured on each one unearthing share half 6. The drive connection between the conveyor disks 2 is achieved through drive shafts 34, which can be driven for example from a center drive location of the machine. The drive shafts 34 thereby permit a varying elevational position of the individual unearthing devices.

The share posts 33 are connected to support arms 35, the trailing ends of which have pivot bearings 36 arranged pivotally about a shaft 37 which is secured on the support frame in a manner which is not illustrated in detail and which is guided through the pivot bearings 36. This type of construction permits in a simple manner an adjustment of the digging device to the unevennesses of the ground. The distance between the unearthing shares 7 and the conveyor arms 1 can, of course, also in this embodiment be adjusted. However, this is not shown for the sake of simplicity. The inventive device can also be supported laterally shiftably in the frame of the machine, as already is the case in other conventional digging devices. This lateral shifting can be accomplished either by pivoting about a pivot bearing or also by lateral shifting in a guideway.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defines as follows:

1. In a digging device for a single-or-multiple-row turnip harvesting machine having at least one unearthing share which consists of two unearthing share halves, conveyor elements provided in the zone above and laterally beside the unearthing share halves, said conveyor elements being rotatably driven about an axis which lies transversely to the direction of travel and extending approximately parallel with the ground and being provided with conveyor teeth and in which each laterally define a turnip conveying channel, the conveyor teeth of said conveyor elements moving in conveying direction in the area of the unearthing shares, the improvement comprising wherein for both unearthing share halves the conveyor teeth are constructed as conveyor arms supported pivotally and spaced laterally from one another in radial bearing sleeves mounted on a common hub against the force of a spring element, whereby, starting from one bearing sleeve, the radially extending section of the conveyor arm changes at a selected distance from the axis of the hub into an axially parallel lever arm section which extends from one hub side to the other hub side, to which lever arm section is connected a section which projects approximately radially and in the direction of rotation slightly forwardly, the outer end of said section has a catch section which is bent against the direction of rotation of the conveyor arms and slightly toward the turnip conveying channel.

2. The improved unearthing device according to claim 1, wherein as a spring element there is arranged on the hub in the area between the conveyor arms or a rubber tire, on the side surfaces of which rest shackles which are each secured transversely on the radially extending section of the conveyor arms.

3. The improved unearthing device according to claim 1, including shackles which are secured on the radially extending section of the conveyor arms, which shackles are connected to tension or compression springs which are secured with respect to the hub.

4. The improved unearthing device according to claim 1, including a torsion spring connected to the conveyor arms at one end of each thereof and at the other end of each of said springs on the hub.

5. The improved unearthing device according to claim 1, wherein the distance between the conveyor arms and the unearthing shares can be changed.

6. The improved unearthing device according to claim 1, wherein for changing the distance between the conveyor arms and the unearthing shares, crossbars, on which axial bearings for mounting the hub are secured, are arranged adjustably relative to perforated rails, which in turn are secured on a support frame.

* * * * *